Figure 1:
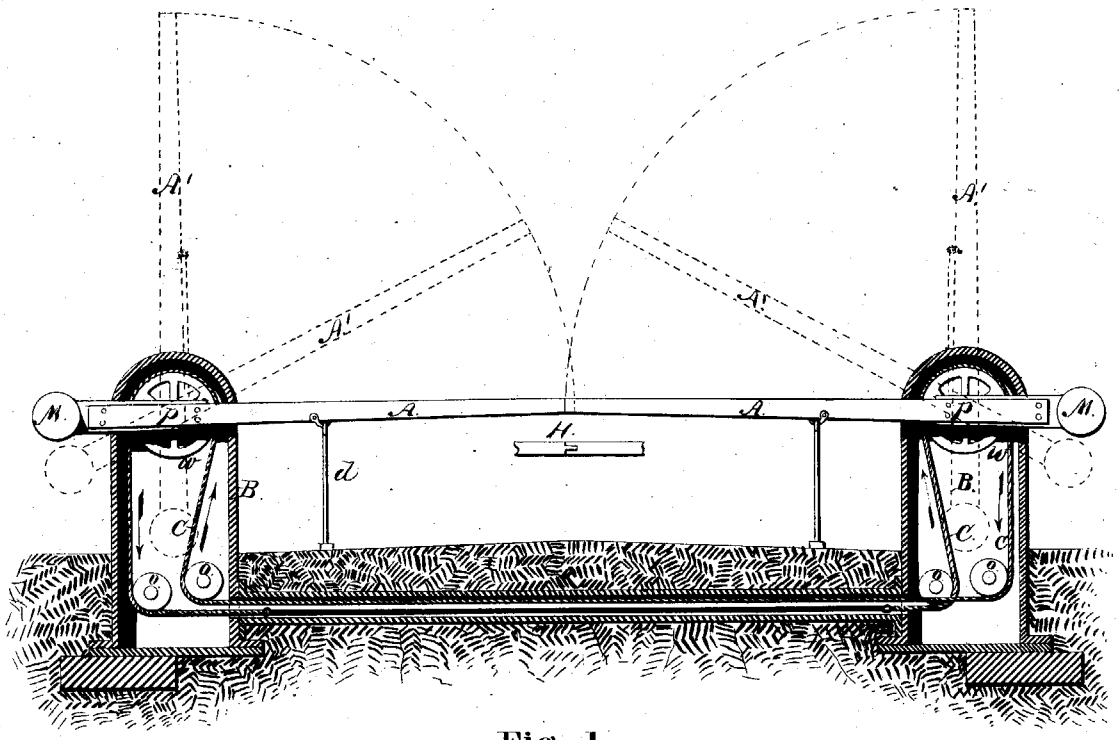

J. S. WINSOR,

Assignor to C. Moies.

GATES.

No. 7,897. Reissued Sept. 25, 1877.

WITNESSES.

L. P. Langworthy

C. S. Larkin

INVENTOR.

Joseph S Winsor by Joseph A. Miller

Attorney

N. PETERS, PHOTO-LITHOGRAPHER, WASHINGTON, D. C.

UNITED STATES PATENT OFFICE.

JOSEPH S. WINSOR, OF PROVIDENCE, RHODE ISLAND, ASSIGNOR TO CHARLES MOIES, OF SAME PLACE.

IMPROVEMENT IN GATES.

Specification forming part of Letters Patent No. 151,260, dated May 26, 1874; Reissue No. 7,451, dated December 26, 1876; Reissue No. 7,897, dated September 25, 1877; application filed July 21, 1877.

*To all whom it may concern:*

Be it known that I, JOSEPH S. WINSOR, of Providence, county of Providence, and State of Rhode Island, have invented certain new and useful Improvements in Gates; and I hereby declare that the following is a full, clear, and exact description of the same, reference being had to the accompanying drawings, forming part of this specification.

Swinging gates as heretofore constructed are defective, for the reason that the sections of the gate, when in closed position, are located so near the surface of the roadway or crossing that the free operation of the gate is seriously impaired by the accumulation of dirt, ice, snow, and the like, against the gate-sections. Again, swinging gates have been furnished with counter-balance weights; but such weights have been arranged in such a manner as not to preserve the same relative position to the gate during its entire movement, and serve to balance the gate in any position it might assume.

The drawing represents a vertical side elevation of my gate, partly in section.

The object of my invention is to provide a vertically-swinging gate for railroad-crossings, ferries, streets, and farms, the swinging bars of the gate being constructed to be practically balanced or equipoised, whereby the bars may be readily raised and lowered with the expenditure of the minimum amount of power. Again, another object to be attained by my invention is to connect the vertically-swinging gate-bars by suitable actuating mechanism, in such a manner that both bars may be actuated simultaneously from any given point desired, and to protect such mechanism from the action of the weather, from frost, and interference, so that the gate will at all times be readily operated.

Another object of the invention is to so arrange the gate-arms that they will act as signals to the engineer in charge of a railroad-train, assuring him by their motion that the road-crossing is clear.

The invention consists, first, in the combination of two vertically-swinging gate-bars, with suitable intervening mechanism, whereby both bars may be operated simultaneously. Second, in the several combinations of parts, as will be hereinafter described, and pointed out in the claims.

In the drawing, A A represent the vertically-swinging gate-bars, which are pivoted at *p p* to the standards B B, the latter being located on opposite sides of the passage or roadway to be provided with my improved gate. The swinging gate-bars are pivoted to the standards B B, so that the distance from the pivots *p p* to the inner ends of the bars shall be considerably greater than the length of the outer ends of the bars, which latter are weighted or constructed to practically counterbalance the inner and longer ends of the bars, by which arrangement such gate-bars can be placed at a lower point and in the position to act more efficiently as a gate, and the standards to which the gate-bars are pivoted may be lower, and consequently more firmly secured.

The gate-bars in opening and closing move in a vertical direction, and, by reason of their being counterbalanced by weights M, may be operated with great facility, and by the exertion of very little power. In order that both bars may be operated simultaneously, thereby rendering it only necessary to employ a single person to attend or operate the gate, the bars or arms are connected by the following mechanism: Wheels or pulleys W W are rigidly secured to the pivots or shafts *p p*, upon which the arms A A have their bearings. Chains *c c* pass over the wheels W W, and around guide-sheaves O O, journaled in the lower portions of the standards B B, the ends of the chains being secured by means of rods *r* located in the tube or under-ground tunnel I.

It will be observed that when motion is imparted to one of the swinging bars A, the opposite bar will be operated simultaneously through the medium of the under-ground connecting mechanism described, and as all the mechanism is contained in the hollow standards B B and the tube or tunnel I, the same is protected from rain, snow, dirt, frost, or other injury, and the gate may be operated at all seasons and at all times promptly. When such a gate is used at the crossings of roads or streets over railroads, the prompt and reliable action of the gate-arms at all times and seasons forms an important safety-signal. The longer arms of the gate-bars being raised vertically, are visible to the engineer on the approaching locomotive, and thus when in this vertical position the gate-arms serve as signals.

I prefer to construct the ends of the bars A A substantially as shown in the drawings at H, namely, to provide the meeting-ends with mortise and tenon, whereby the ends will, of themselves, form a truss-support, and hence be rigidly locked together when in closed position. In order further to support the bars A A, hinged supports *d d* are secured to the bars, and when the latter are raised the supports *d d* fold against the edges of the bar. When the bars are lowered the supports *d d* gradually unfold, and finally rest on the roadway, thereby constituting columns for the support of the arms or bars.

The counterweights M are of such weight, or are secured to the short arm of the bars at such relative distance from their fulcra, that the bars will be equipoised in whatever position they may be adjusted, and the same result would be secured if the counter-balance were suspended from or over a segment attached to the gate-bars, provided the line of suspension would be at all times at a fixed distance from the pivot or bearing on which the bars swing.

Gates constructed in accordance with my invention may be adapted to any width of roadway or crossing. The swinging bars are light in construction, and, owing to the fact that they are practically counterbalanced, they are enabled to be operated with ease and rapidity. Another important feature of my invention consists in the fact that the bars are not hindered in their action by the accumulation of dirt, ice, snow, and the like, about the working or moving parts of the gate, as all such portions of the gate are effectually protected and inclosed by the standards, and trough or tunnel within which the actuating and connecting mechanism is arranged.

The gate is especially adapted for use at the crossings of street or roads over railroads. Street-crossings of great width may be closed by this gate, as the swinging bars may be made very light in weight, and both bars easily operated by a single attendant.

Having thus fully described my invention, what I claim as new, and desire to secure by Letters Patent, is—

1. The combination, with posts or standards B B, located on opposite sides of the gate-opening, of vertically-swinging gate-bars A A, pivoted to shafts secured to standards B B, the gate-bars A A having their shorter ends weighted to practically counterbalance the longer ends, substantially as and for the purpose set forth.

2. The combination, with posts or standards B B, located on opposite sides of the gate-opening, of the swinging gate-bars A A, pivoted to said standards, the bars A A, provided with weight M to practically counterbalance the gate-bars, substantially as and for the purpose set forth.

3. The combination, with two counterbalanced vertically-swinging gate-bars, of intervening mechanism, substantially as set forth, whereby both bars may be retained in any desired position and actuated simultaneously, substantially as and for the purpose set forth.

4. The combination, with the hollow standards B B, arranged to contain the operating mechanism, of the trough or tunnel I, arranged to contain the connecting mechanism by means of which the gate is operated and the mechanism protected, substantially as and for the purpose set forth.

5. A railroad-crossing gate, consisting of two vertically-swinging gate-bars, connected by intervening mechanism, whereby they may be operated simultaneously, arranged to act both as a gate and a signal, substantially as and for the purpose set forth.

6. A gate consisting of two vertically-swinging gate-bars, connected by intervening mechanism, whereby they may be operated simultaneously, said bars being constructed so that their inner ends shall interlock with each other when the gates are closed, substantially as and for the purpose set forth.

7. The combination, with the counterbalanced vertically-swinging gate-bars A A, pivoted to the posts or standards B B, of the connections *c r*, pulleys *u w*, and sheaves *o o*, substantially as and for the purpose set forth.

JOSEPH S. WINSOR.

Witnesses:

JOSEPH A. MILLER,
AMOS A. WHITE.